(12) United States Patent
Heichelbech et al.

(10) Patent No.: US 11,484,825 B1
(45) Date of Patent: Nov. 1, 2022

(54) DEVICES, SYSTEMS, FACILITIES AND PROCESSES FOR CARBON CAPTURE OPTIMIZATION IN INDUSTRIAL FACILITIES

(71) Applicant: NEXT CARBON SOLUTIONS, LLC, Houston, TX (US)

(72) Inventors: Ben Heichelbech, Houston, TX (US); Ivan Van der Walt, Conroe, TX (US); Connor Rivard, Houston, TX (US); Alex Thompson, Sugar Land, TX (US)

(73) Assignee: NEXT CARBON SOLUTIONS, LLC, Houston, TX (US)

( * ) Notice: Subject to any disclaimer, the term of this patent is extended or adjusted under 35 U.S.C. 154(b) by 0 days.

(21) Appl. No.: 17/556,332

(22) Filed: Dec. 20, 2021

(51) Int. Cl.
  *B01D 53/14* (2006.01)
  *F28D 21/00* (2006.01)
  *B01D 53/18* (2006.01)
  *F23J 15/08* (2006.01)
  *F23J 15/06* (2006.01)

(52) U.S. Cl.
  CPC ..... *B01D 53/1425* (2013.01); *B01D 53/1475* (2013.01); *B01D 53/18* (2013.01); *F28D 21/001* (2013.01); *F23J 15/06* (2013.01); *F23J 15/08* (2013.01); *Y02C 20/40* (2020.08)

(58) Field of Classification Search
  CPC ............ B01D 53/1425; B01D 53/1475; B01D 53/18; F28D 21/001; F23J 15/06; F23J 15/08; Y02C 20/40
  See application file for complete search history.

(56) References Cited

U.S. PATENT DOCUMENTS

| | | | | |
|---|---|---|---|---|
| 2,157,879 | A * | 5/1939 | Zublin | B01D 53/526 423/236 |
| 7,424,808 | B2 * | 9/2008 | Mak | B01D 53/1456 423/220 |
| 7,674,325 | B2 * | 3/2010 | Won | B01D 53/1425 95/204 |
| 9,149,761 | B2 * | 10/2015 | Northrop | C01B 17/0404 |
| 10,315,150 | B2 * | 6/2019 | Huntington | F25J 3/0266 |
| 2004/0079228 | A1 * | 4/2004 | Wijmans | B01D 53/263 95/231 |
| 2005/0172807 | A1 * | 8/2005 | Mak | B01D 53/1462 95/235 |
| 2006/0248890 | A1 * | 11/2006 | Iijima | F01K 25/103 423/437.1 |
| 2008/0210092 | A1 * | 9/2008 | Buckles | B01D 53/1462 95/227 |
| 2011/0192191 | A1 * | 8/2011 | Timminns | F25J 3/067 62/617 |
| 2012/0234177 | A1 * | 9/2012 | Yonekawa | B01D 53/1425 96/242 |
| 2013/0056677 | A1 * | 3/2013 | Bela | B01D 53/1468 252/190 |
| 2018/0170839 | A1 * | 6/2018 | Kurukchi | C07C 7/04 |

\* cited by examiner

*Primary Examiner* — Stephen Hobson
(74) *Attorney, Agent, or Firm* — K&L Gates LLP (57) ABSTRACT

Devices, systems, and methods for carbon capture optimization in industrial facilities are disclosed herein. An example carbon capture process involves cooling a flue gas stream using at least one gas-to-air heat exchanger disposed upstream of a carbon dioxide (CO2) absorber. Another example carbon capture process involves heating a heat medium for solvent regeneration and CO2 stripping using a fired heater and/or using at least one waste heat recovery unit.

5 Claims, 6 Drawing Sheets

DEVICES, SYSTEMS, FACILITIES AND PROCESSES FOR CARBON CAPTURE OPTIMIZATION IN INDUSTRIAL FACILITIES

BACKGROUND

Industrial facilities that utilize combustion fuels may generate greenhouse gases. Greenhouse gases include various gaseous compounds, such as carbon dioxide, methane, nitrous oxide, hydrofluorocarbons, perfluorocarbons, and sulfur hexafluoride for example, which absorb radiation, trap heat in the atmosphere, and/or otherwise contribute to undesirable environmental greenhouse effects.

Carbon capture processes can be employed to remove and/or reduce greenhouse gas emissions. There are several challenges associated with traditional implementations of post combustion carbon capture processes in industrial facilities. One challenge involves parasitic power loads which may negatively impact the output and efficiency of an industrial facility that employs the carbon capture process. Another challenge involves additional cooling water loads traditionally used in carbon capture systems and the environmental impacts related to the use of such additional cooling water. To enable effective absorption of carbon dioxide from a flue gas and reduce degradation of the absorbing media, conventional carbon capture processes typically use evaporative cooling water systems to cool the carbon dioxide rich flue gas. Cooling water systems can be costly as they typically require a stream of make-up fresh water to replenish their cooling water loop, and thus place a significant demand on utilities and fresh-water sources.

SUMMARY

The present disclosure provides novel and improved carbon capture systems, devices, facilities, and methods. In an example, a method for processing a flue gas stream involves cooling the flue gas stream using at least a gas-to-air heat exchanger disposed upstream of and in fluid communication with a carbon dioxide (CO2) absorber. The method also involves moving, by a flue gas blower, the flue gas stream through the gas-to-air heat exchanger and the CO2 absorber. The method also involves moving, by a cooling air blower, air through the gas-to-air heat exchanger to cool the flue-gas stream.

In an example, a method for processing a flue gas stream involves receiving, at a solvent regenerator, a rich solvent flowing from a carbon dioxide (CO2) absorber. The rich solvent includes CO2 captured from the flue gas stream in the CO2 absorber. The method can also involve heating a heat medium using at least a fired heater, where additional heat is not available in the host facility. The method also involves transporting the heated heat medium from the fired heater to the solvent regenerator. The method also involves generating a fired heater flue gas by the fired heater. The method also involves transporting the fired heater flue gas into the flue gas stream at a position upstream of the CO2 absorber.

In an example, a system for processing a flue gas stream includes a gas-to-air heat exchanger disposed upstream of and in fluid communication with a carbon dioxide (CO2) absorber. The gas-to-air heat exchanger to receive and cool the flue gas stream. The gas-to-air heat exchanger to transport the cooled flue gas stream through and out of the gas-to-air heat exchanger toward the CO2 absorber. The system also includes a flue gas blower to move the flue gas stream through the gas-to-heat exchanger and the CO2 absorber. The system also includes a cooling air blower to move air through the gas-to-air heat exchanger to cool the flue gas stream.

In an example, a system for processing a flue gas stream includes a carbon dioxide (CO2) absorber to receive the flue gas stream. The system also includes a solvent regenerator in fluid communication with the CO2 absorber. The solvent regenerator to receive a rich solvent from the CO2 absorber and to provide a lean solvent to the CO2 absorber. The lean solvent having a lower amount of CO2 than the rich solvent. They system also can include a fired heater in fluid communication with the solvent generator, where additional waste heat is not available from the host facility. The fired heater to heat and transport a heat medium toward the solvent regenerator. The fired heater to generate a fired heater flue gas and transport the fired heater flue gas out of the fired heater for combination with the flue gas stream at a position upstream of the CO2 absorber.

Additional examples, features, and advantages of the disclosed devices, systems, facilities, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, a particular embodiment does not necessarily have all of the advantages listed herein. Moreover, it should be noted that the language used in the specification has been principally selected for readability and instructional purposes, and not to limit the scope of the inventive subject matter.

BRIEF DESCRIPTION OF THE FIGURES

Understanding that the figures depict specific example embodiments and are not to be considered to be limiting the scope of the present disclosure, the present disclosure is described and explained with additional specificity and detail through the use of the accompanying figures. The figures are listed below.

DETAILED DESCRIPTION OF EXAMPLE EMBODIMENTS

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One of ordinary skill in the art could implement numerous alternate embodiments, which would still fall within the scope of the claims. Unless a term is expressly defined herein using the sentence "As used herein, the term '______' is hereby defined to mean . . ." or a similar sentence, there is no intent to limit the meaning of that term beyond its plain or ordinary meaning. To the extent that any term is referred to in this patent in a manner consistent with a single meaning, that is done for sake of clarity only, and it is not intended that such claim term be limited to that single meaning. Finally, unless a claim element is defined by reciting the word "means" and a function without the recital of any structure, it is not intended that the scope of any claim element be interpreted based on the application of 35 U.S.C. § 112(f).

The present disclosure provides novel processes, apparatuses, and systems that can be used individually or in combination to optimize utility costs associated with a carbon capture process, such as costs associated with cooling a post-combustion flue gas stream and costs associated with heating a heat medium for a solvent regeneration and $CO_2$ stripping process.

Figure 1:
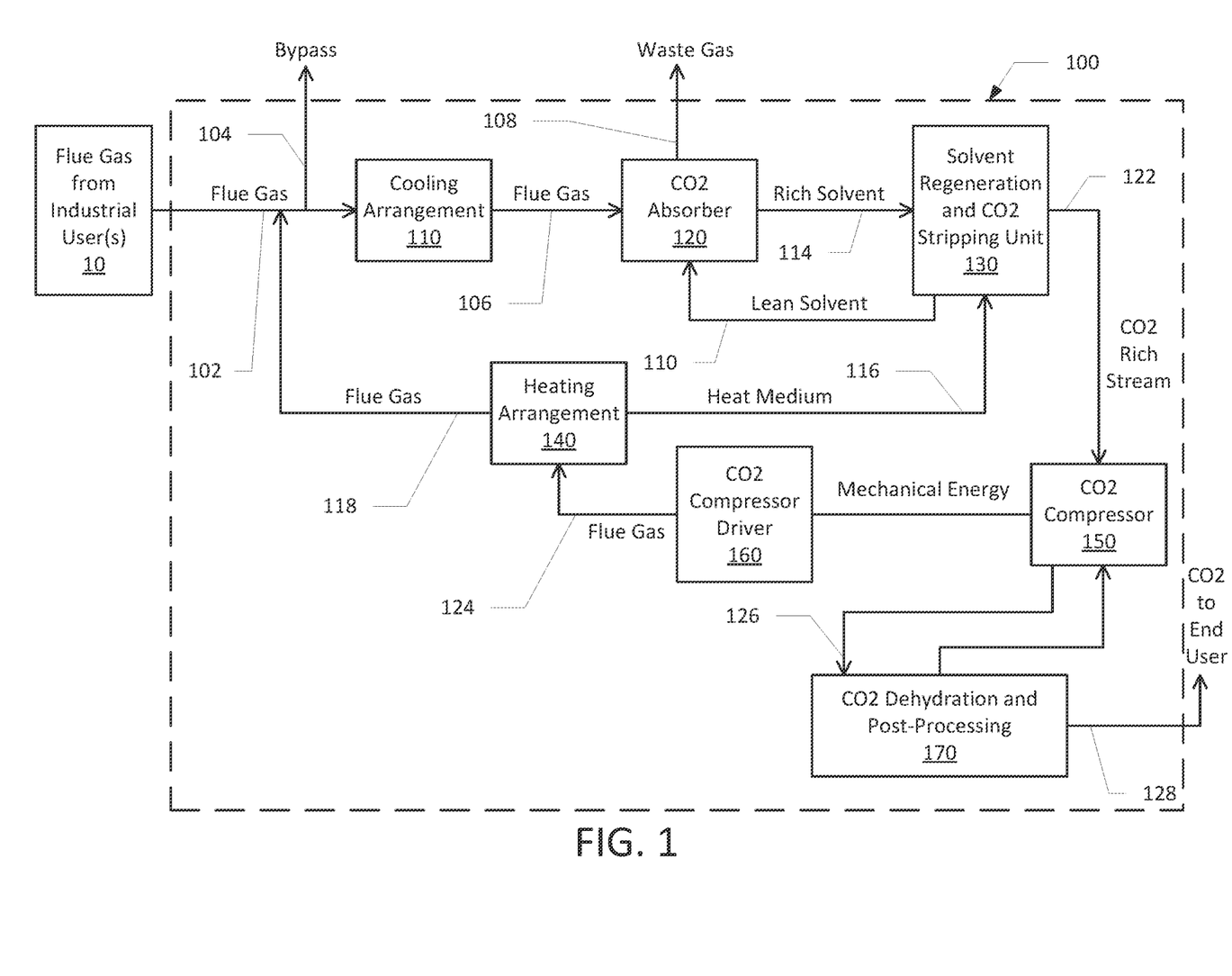
FIG. 1 is a schematic illustration of an example carbon capture facility that includes a cooling arrangement and a heating arrangement, according to an example embodiment.

Referring now to the figures, FIG. 1 illustrates an exemplary schematic of a carbon capture facility 100. The facility 100 receives a post-combustion flue gas stream 10, which may be from an industrial facility or other combustion system. The flue gas stream 10 is transported through one or more components of the system 100 along a fluid path defined by fluid connections or conduits 102-108. The directions of each of the arrows 102-108 in the illustration of FIG. 1 represents a downstream direction of the flow path of the flue gas stream 10 from or to component(s) of the system 100 at end(s) of the respective arrow.

For example, the conduit 102 transports the flue gas stream 10 downstream to a cooling arrangement 110. The cooling arrangement 110 is disposed upstream of absorber 120 to cool the flue gas stream 10 flowing out of the cooling arrangement toward and into the absorber 120 via conduit 106. The flue gas stream 10 then flows out of the absorber 120 at conduit 108 as a waste gas stream having a lower concentration of $CO_2$ than the flue gas stream 10 flowing into the absorber 120. In an example, the waste gas stream 10 exiting the absorber 120 via the conduit 108 may be released into the atmosphere. A bypass conduit 104 may be included to enable selectively routing the flue gas stream 10 (or a portion thereof) out of the conduit 102 and away from other components of the carbon capture facility 100 (e.g., away from the cooling arrangement 110, etc.), and thus selectively bypass the carbon capture process, bypass 104 also allows the host facility to operate without the operation of the carbon capture unit (e.g. carbon capture facility is down for maintenance, host facility can still operate with flue gas exiting through bypass 104).

More generally, unless otherwise specified herein, arrows (e.g., arrows 102-108, 112-118, 122-128, etc.) depicted in the Figures of the present disclosure which extend from or to various components may represent a fluid connection or conduit (e.g., piping, etc.) configured to transport a fluid (e.g., flue gas, air, solvent, water, etc.) from or to component(s) at end(s) of the respective arrow. Further, an arrow direction of the respective arrow represents a flow direction (e.g., downstream direction) of a fluid flowing inside the conduit represented by the respective arrow.

The absorber 120 may include a contactor (e.g., gas-liquid contactor, gas-to-gas contactor, etc.) or any other type of device in which a lean absorbing media is brought into contact with the flue gas stream 10 flowing inside the absorber 120 to capture $CO_2$ from the flue gas stream 10. The absorbing media can be ammonia, amine based, carbonate based (e.g., potassium carbonate), ionic fluid, and/or any other type of solvent. Prior to contact with the flue gas stream 10, the solvent (e.g., "lean solvent") entering the absorber 120 (via conduit 112) is $CO_2$ lean. After contact with the flue gas stream 10, the solvent (e.g., "rich solvent") exiting the absorber 120 (via conduit 114) is $CO_2$ rich. In examples, the rich solvent exiting the absorber 120 (via the conduit 114) may include a greater amount of $CO_2$ (and/or a greater amount of carbon) than the lean solvent entering the absorber 120 (via the conduit 112).

A solvent regeneration and $CO_2$ stripping unit 130 may be disposed in fluid communication with the absorber 120 to receive the rich solvent (via the conduit 114) from the absorber 120 and to provide the lean solvent (via the conduit 112) to the absorber 120. To that end, the regeneration and $CO_2$ stripping unit 130 may be interchangeably referred to herein as a solvent regenerator 130, a regenerator 130, $CO_2$ stripper 130, and/or a stripper 130. The regenerator stripper 130 may be configured to convert the rich solvent into the lean solvent by stripping $CO_2$ (or carbon) from the rich solvent. To facilitate this, in an example, the regenerator 130 may heat the rich solvent using a heat medium (e.g., steam or oil) so as to remove or separate the $CO_2$ (or carbon) from the rich solvent.

The system 100 may also include a heating arrangement 140 configured to heat the heat medium and provide the heated heat medium to the regenerator 130 via a conduit 116. In examples, the heating arrangement 140 may include one or more combustion-based devices configured to heat the heat medium and thus produce a heating system flue gas. In an example, the heating system flue gas may be transported out of the heating arrangement 140 (e.g., via a conduit 118) for combination with the flue gas stream 10 at a front end (e.g., into the conduit 102) of the carbon capture system 100 or at any other position upstream of the $CO_2$ absorber 120

The regenerator stripper 130 may output a $CO_2$ rich stream that includes $CO_2$ extracted from the rich solvent to a conduit 122 so as to transport the $CO_2$ rich stream to a compressor 150. The compressor 150 may compress the $CO_2$ rich gas stream (received via the conduit 122 from the regenerator 130) for other users or applications, such as for sequestration (e.g., underground or underwater storage, etc.) or other industrial uses. In some examples, the compressor 150 is a multi-stage compressor.

The system 100 also includes a driver 160 coupled to the compressor 150. The driver 160 may be configured to provide mechanical energy to the compressor 150 for compressing the $CO_2$ rich stream (e.g., received at the compressor 150 from the conduit 122). In examples, the driver 160 may be an internal combustion engine or other type of combustion-based driver that burns a fuel to produce the mechanical energy for driving the compressor 150. As such, in some examples, the compressor driver 160 may produce a driver flue gas (e.g., as a byproduct of fuel combustion by the driver 160, etc.). The driver flue gas may be transported out of the driver 160 (via a conduit 124) to the heating arrangement 140. For example, the heating arrangement 140 may include a waste heat recovery unit (not shown in FIG. 1) configured to extract heat from the driver flue gas to heat the head medium provided (via the conduit 116) to the regeneration and stripping unit 130. Furthermore, in an example, the driver flue gas may eventually (e.g., after heat recovery in the heating arrangement 140) be routed (e.g., via the conduit 118) to the front-end of the carbon capture process (e.g., upstream of the cooling arrangement 110) or to any other position upstream of the CO2 absorber 120 for combination into the flue gas stream 10.

The system 100 may also include a CO2 dehydration and post-processing unit 170 in fluid communication with the compressor 150 to receive the compressed CO2 from the compressor 150 via conduit 126. The dehydration and post-processing unit 170 will be configured to remove water and/or other constituents (e.g., contaminants, etc.) such that the compressed CO2 is of a suitable quality and composition for an end user of the compressed CO2. In the illustrated example, the post-processed and/or dehydrated compressed CO2 is transported out of the carbon capture system 100 via a conduit 128.

In examples, the compressor 150 and/or the dehydration and post-processing unit 170 sends (e.g., via the conduit 128 or via another conduit not shown in FIG. 1) the compressed CO2 away from the system 100 to a carbon user or to a sequestration site. In an example, the compressed CO2 may be sent to an off-site sequestration facility (not shown), such as an underground geological formation that includes an at least partially depleted hydrocarbon reservoir, or any other sequestration site. In an example, the sequestration site may be on top of a seabed (e.g., at a three kilometer depth or greater below sea level, etc.). In an example, the sequestration site is below a seabed.

As noted above, conventional carbon capture processes typically cool flue gas using a cooling water quench system with cooling towers (e.g., "evaporative cooling water system"), which cools the flue gas through the evaporation of at least a portion of the cooling water. Such evaporative cooling water systems typically consume water from an environmental source or from a local utility, to replenish the evaporated water, and may thus have negative effects on the environment. Furthermore, in some facilities, it may not be feasible to continuously supply replenish cooling water for an evaporative cooling water system due to facility location and/or other factors.

Accordingly, example cooling arrangements are disclosed herein, such as those described below in connection with FIGS. 2 and 3, that advantageously enable cooling a flue gas stream without necessarily requiring the use of additional cooling water and/or without necessarily using an evaporative cooling water system. To facilitate this, an example cooling arrangement may include one or more gas-to-air heat exchangers arranged to cool the flue gas stream 10 upstream of the CO2 absorber 120.

Figure 2:
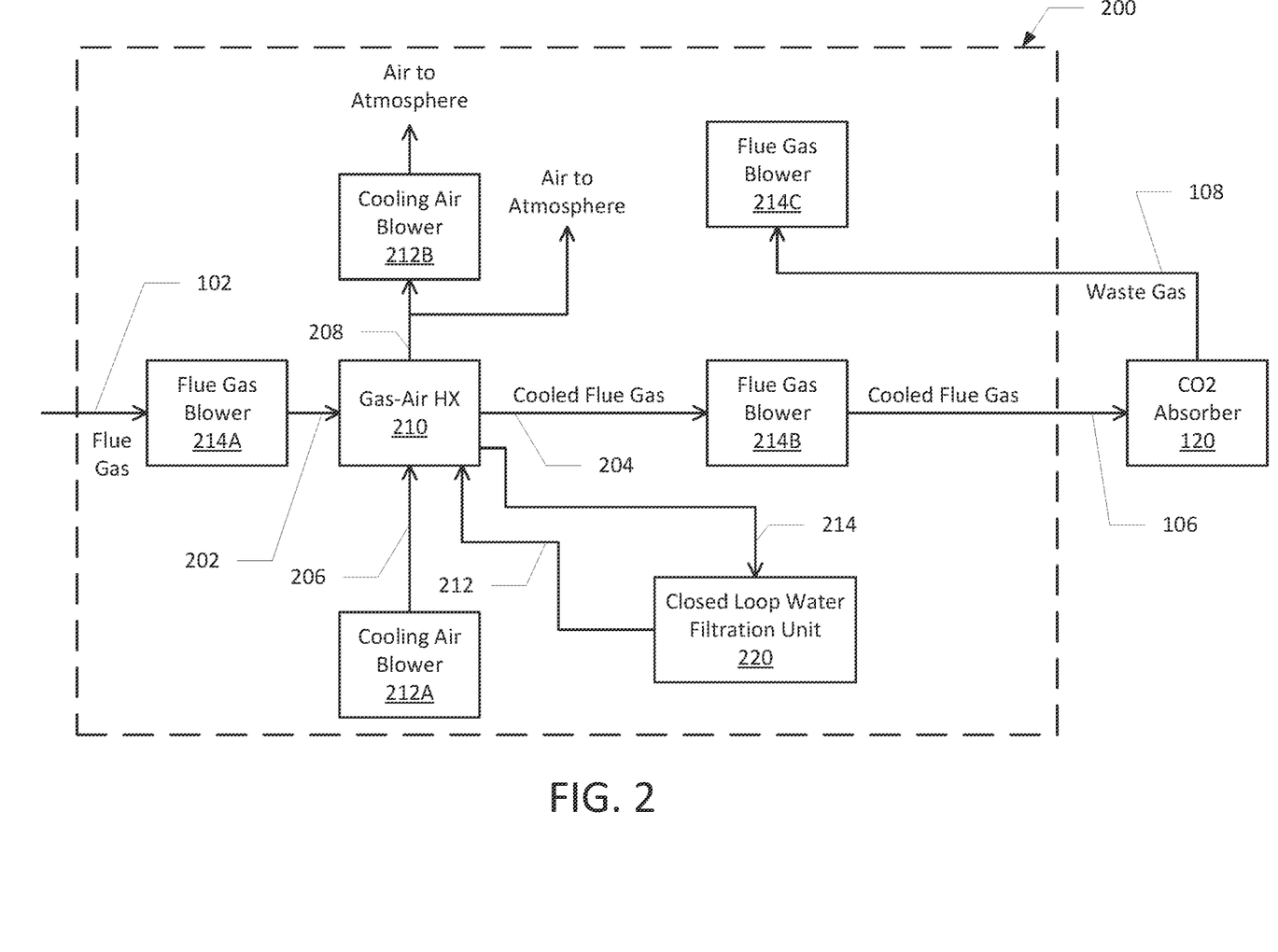
FIG. 2 is a schematic illustration of a first example cooling arrangement that includes a gas-to-air heat exchanger for cooling a flue gas stream in a carbon capture process, according to an example embodiment.

FIG. 2 is a schematic illustration of an example cooling arrangement 200, which may be used to implement the cooling arrangement 110 of the system 100 for example.

In the illustrated example, the cooling system 200 includes a gas-to-air heat exchanger 210 disposed upstream of and in fluid communication with the absorber 120. In examples, the gas-to-air heat exchanger 210 may be a gas-to-gas heat exchanger that uses air as a cooling medium flowing through the heat exchanger 210. For example, the heat exchanger 210 may define separate flow paths for the air (entering the heat exchanger 210 at conduit 206 and exiting the heat exchanger at conduit 208) and the flue gas stream (entering the heat exchanger at conduit 202 and exiting the heat exchanger at conduit 204) so that the two gas streams (i.e, the cooling air and the flue gas stream) are not mixed with one another inside the heat exchanger 210. In an example, the flue gas stream 10 may flow into the heat exchanger 210 through a first gas inlet (connected to conduit 202) of the heat exchanger 210 and may flow out of the heat exchanger through a first gas outlet (connected to conduit 204). Inside the heat exchanger 210, heat from the flue gas stream 10 may be transferred to cooling air (e.g., ambient air) or other cooling medium flowing into the heat exchanger 210 through a second gas inlet (connected to conduit 206) and flowing out of the heat exchanger 210 through a second gas outlet (connected to conduit 208).

The system 200 may also include at least one cooling air blower to move the air flowing through the gas-to-air heat exchanger 210, and at least one flue gas blower to move the flue gas stream flowing through the gas-to-air heat exchanger 210 and the CO2 absorber 120. In general, a blower is a device (e.g., fan, etc.) structured to vent or move a gas (e.g., flue gas or air) through, toward, and/or away from one or more components, and/or more generally to move the gas along a fluid path defined by a system such as the system 200.

Although FIG. 2 depicts two air blowers 212A-B in fluid communication with the heat exchanger 210, in some examples, the system 200 may alternatively include only one of the air blowers 212A-B. For example, the system 200 may be alternatively implemented using a single cooling air blower disposed at one of the positions 212A (upstream) or 212B (downstream) in fluid communication with the heat exchanger 210. Each of the positions 212A (upstream) and 212B (downstream) may provide different advantages, as described in more detail below.

In an example, the system 200 may include the cooling air blower 212A disposed upstream of the gas-to-air heat exchanger 210 to blow air (e.g., ambient air) toward the gas-to-air heat exchanger 210. In this upstream configuration, the air blower 212A may advantageously operate at an increased efficiency due to a relatively cooler temperature of the air flowing through the blower 212A (i.e., prior to being heated inside the heat exchanger 210). The upstream configuration of the air blower 212A may also be associated with lower maintenance costs compared to a configuration (e.g., downstream) in which an air blower blows a hotter stream of air. On the other hand, the upstream air blower 212A may compress (and thus heat) air entering the heat exchanger 210, thereby potentially reducing an efficiency of the heat exchanger 210 with respect to transferring heat from the flue gas stream 10 to the air as compared to a configuration where the air flowing into the heat exchanger 210 is relatively cooler.

In an example, the system 200 may include the cooling air blower 212B disposed downstream of the gas-to-air heat exchanger 210 to blow the air (i.e., after the air exits from the heat exchanger 210 via conduit 208) away from the gas-to-air heat exchanger 210. With such downstream configuration, the blower 212B may advantageously improve a cooling efficiency of the heat exchanger 210 by pulling the air exiting from the exchanger 210 (via conduit 208) instead of pushing the air flowing into the exchanger 210 (via conduit 206). In particular, the downstream position 212B of the air blower may result in relatively cooler air entering the exchanger 210, because the air is not compressed (and thus heated) by the downstream air blower 212B until after it exits the heat exchanger 210 (via conduit 208). On the other hand, the downstream position of the air blower 212B may be associated with increased power requirements and/or maintenance costs due to relatively warmer air flowing through the blower 212B after it exits the heat exchanger 210 (as compared to power requirements maintenance costs associated with blowing cooler air).

Thus, in some examples, a carbon capture process (e.g., system 100) that implements the cooling system 200 can be optimized by selecting a suitable position 212A (upstream) or 212B (downstream) for positioning the cooling air blower, depending on system parameters such as cooling efficiency requirements, parasitic load requirements, maintenance cost requirements, temperature range of the flue gas stream 10, flow rate of the flue gas stream 10, and/or any other parameters or tolerances specific to an industrial facility or carbon capture process that employs the cooling arrangement 200.

In some examples, the heat exchanger 210 may use a different type of gas as a cooling medium instead of or in addition to air. In an example, the waste gas stream exiting from the absorber 120 (or a portion thereof) can optionally be used to cool the relatively hotter CO2 flue gas stream inside the heat exchanger 210 in addition to or instead of ambient air. More generally, in some examples, the system 200 may advantageously enable using a gas (e.g., cooling air) as a cooling medium for cooling the flue gas stream 10. For example, unlike evaporative cooling water systems which rely on water evaporation and which replenish the evaporated water using an external water source (e.g., lake, river, local utility etc.), the system 200 may enable cooling a flue gas stream by using ambient air and/or any another cooling gas medium readily available to the system 200.

The system 200 also includes at least one flue gas blower 214A-C to move the flue gas stream through the heat exchanger 210 and the absorber 120. Although FIG. 2 depicts three flue gas blowers 214A-C in fluid communication with the heat exchanger 210, the system 200 may alternatively include fewer or more flue gas blowers. In some examples, the system 200 is implemented using a flue gas blower disposed at one of the positions 214A-C without one or more of the other flue gas blowers. In an example, one of the positions 214A-C may be selected as a position of a flue gas blower coupled to the heat exchanger 210 depending on various applications of the system 200. As described in more detail below, each of the positions 214A-C may have different advantages which may be suitable for various different applications of the system 200.

In an example, the system 200 may include the flue gas blower 214A disposed upstream of the heat exchanger 210 to blow the flue gas stream 10 toward the heat exchanger 210. A flue gas blower at the position 214A may advantageously add energy to the flue gas stream 10 (in the form of heat due to compression by the blower 214A) prior to entry of the flue gas stream 10 into the heat exchanger 210. For example, the energy (or a portion thereof) added by the upstream blower 214A could potentially be removed or reduced by the heat exchanger 210. However, a flue gas blower disposed at the position 214A may receive the flue gas stream 10 having a relatively higher temperature, and could thus potentially require more power to operate than if it were blowing relatively cooler flue gas. Further, the blower 214A may need to be constructed using relatively more expensive materials that can withstand the elevated temperatures and/or may require more frequent maintenance actions compared to a configuration where a blower blows relatively cooler flue gas.

In an example, the system 200 may include the flue gas blower 214B disposed downstream of the gas-to-air heat exchanger 210 (and upstream of the absorber 120) to blow the flue gas stream 10 (after it is cooled by the heat exchanger 210) away from the heat exchanger 210. A flue gas blower at position 214B may advantageously contact the flue gas stream 10 after it is cooled by the heat exchanger 210. Due to the relatively lower temperature of the flue gas stream at position 214B, the flue gas blower 214B may be associated with relatively lower power requirements, material costs, and/or maintenance costs compared to a flue gas blower at position 214A. On the other hand, positioning the flue gas blower at position 214B may result in adding energy (i.e., heat due to compression by the flue gas blower 214B) into the flue gas stream 10 after it is cooled by the heat exchanger 210, thereby warming up the flue gas stream entering into the absorber 120, and thus potentially reducing a carbon capture efficiency of a solvent in the absorber 120. For instance, the solvent may capture CO2 more efficiently at lower temperatures.

In an example, the system 200 may include the flue gas blower 214C disposed downstream of the absorber 120 to blow the waste gas stream away from the absorber 120. As noted above, the waste gas stream includes at least a portion of the flue gas stream 10 exiting the absorber 120 (after CO2 is absorbed by a solvent in the absorber 120), and thus the waste gas stream has a lower concentration of CO2 than the flue gas stream 10 entering the absorber 120. As such, a flue gas blower disposed at the position 214C may advantageously blow the waste gas stream having a lower volume and lower temperature than the flue gas stream 10 at positions 214A-B, which may result in efficiency improvements and/or power load reductions compared to blowing higher volumes of flue gas at higher temperatures. However, disposing the flue gas blower at position 214C may be associated with higher installation and/or maintenance costs in some scenarios. For example, in some configurations, the waste gas stream may be output from a top side of the absorber 120, and thus using the position 214C may require installing the flue gas blower at a relatively higher elevation associated with relatively more challenging structural requirements to support the flue gas blower 214C effectively and safely at the higher elevation.

As noted above, the system 200 can be optimized by customizing the numbers and/or positions of the cooling air blower and/or the flue gas blower depending on the specific parameters and tolerances of the carbon capture process that employs the cooling system 200 (e.g., temperature of flue gas stream, flow rate of the flue gas stream, parasitic load threshold, cost requirements, etc.). For example, position 214A may be more desirable in some industrial facility applications than position 214C, or vice versa.

The system 200 may also include a closed loop water filtration unit 220 in fluid communication with the heat exchanger 210. For example, the closed loop water filtration unit 220 may be coupled to a ducting of the gas-to-air heat exchanger 210 so as to provide water (via conduit 212) which is sprayed onto the flue gas stream 10 inside the heat exchanger 210 to separate and condense particulates. The condensed water including the impurities (e.g., contaminants such as sulfur oxides, etc.) removed from the flue gas stream 10 may then be collected and returned to the closed loop water filtration unit 220 (via conduit 214), where the water is filtered to remove the contaminants and returned to the heat exchanger 210 to complete the closed water filtration loop. With this arrangement for instance, an efficiency of the solvent in the absorber 120 could potentially be improved by removing these contaminants upstream of the absorber 120. Alternatively or additionally, although not shown, the closed loop water filtration unit 220 may be coupled to the absorber 120 to cool and/or wash the waste gas stream exiting from the absorber 120.

Figure 3:
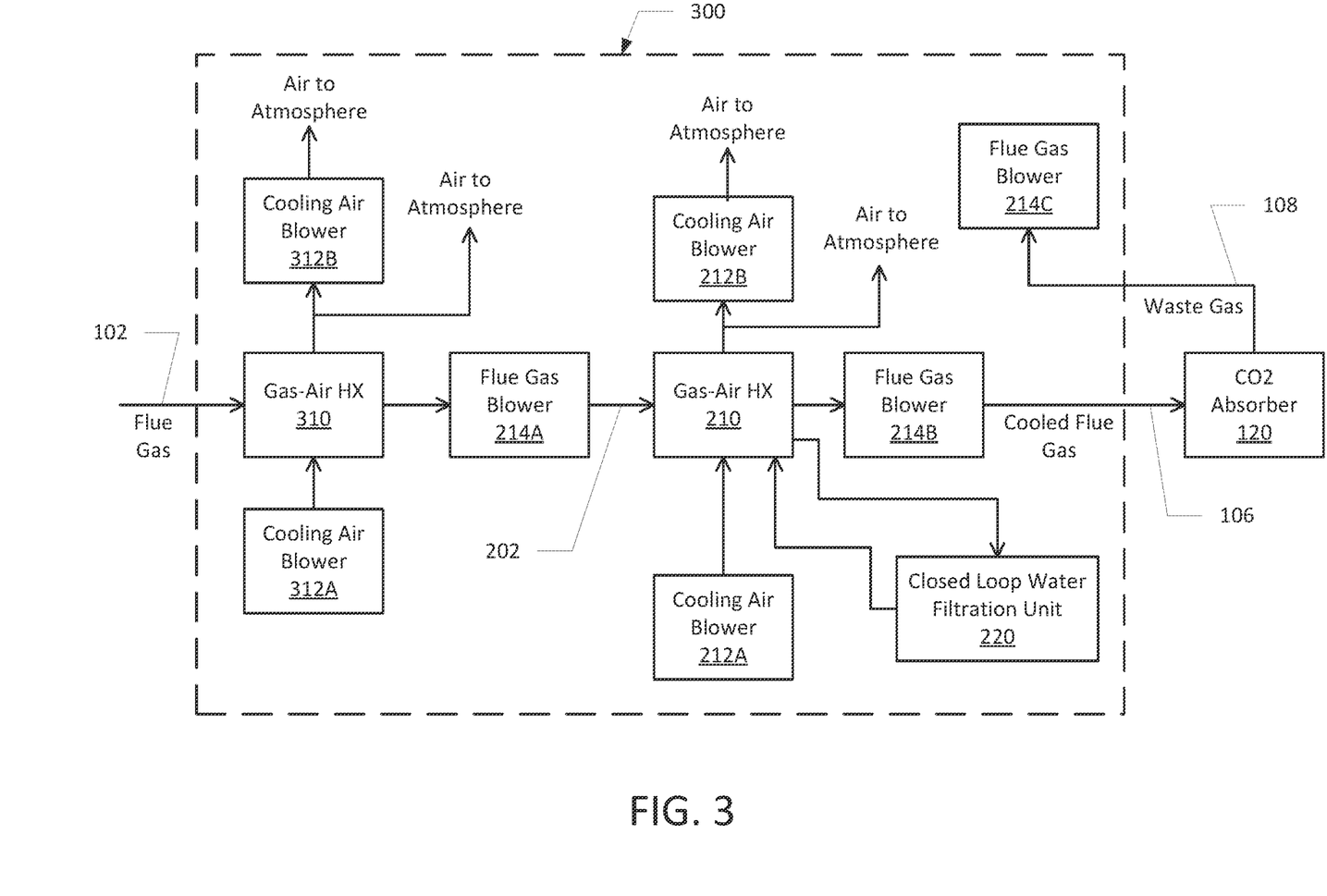
FIG. 3 is a schematic illustration of a second example cooling arrangement that includes multiple gas-to-air heat exchangers for cooling a flue gas stream in a carbon capture process, according to an example embodiment.

FIG. 3 is a schematic illustration of another example cooling arrangement 300 that includes multiple gas-to-air heat exchangers 210, 310 disposed upstream of the absorber 120, in accordance with the present disclosure. In some scenarios, a single gas-to-air heat exchanger may be insufficient to cool the flue gas stream 10 to a suitable temperature for efficient absorption of CO2 by the solvent inside the absorber 120. As such, in the illustrated example, one or more additional gas-to-air heat exchangers (e.g., heat exchanger 310) may be disposed upstream of the absorber 120 to further cool the flue gas stream 10 prior to flowing into the absorber 120.

In the example of FIG. 3, the gas-to-air heat exchanger 310 may receive (via conduit 102) and cool the flue gas stream 10 and then the gas-to-air heat exchanger 210 may receive the cooled flue gas stream 10 to further cool the flue gas stream 10 prior to the flue gas stream 10 flowing into the absorber 120.

To that end, in the illustrated example, the cooling system 300 may include the flue gas blower 214A, 214B, and/or 214C to move the flue gas stream 10 through the heat exchanger 310, the heat exchanger 210, and the absorber 120. In an example, although not shown, the system 300 may include a flue gas blower disposed upstream of the heat exchanger 310 instead of or in addition to the flue gas blowers 214A, 214B, and/or 214C.

Further, the system 300 may include a cooling air blower 312A disposed upstream of the heat exchanger 310 to blow cooling air toward and through the heat exchanger 310 (e.g., similarly to the blower 212A of heat exchanger 210), and/or include a cooling air blower 312B disposed downstream of the heat exchanger 310 (e.g., similarly to blower 212B of heat exchanger 210) to blow and move the cooling air away and through the heat exchanger 310.

More generally, the cooling systems 110, 200, 300, etc., of the present disclosure may be customized according to the needs of an industrial facility that employs the carbon capture process 100. Thus, the numbers and/or positions of the gas-to-air heat exchangers, cooling air blower(s), and/or flue gas stream blower(s) used in the system 200 and/or 300 can be customized depending on factors such as the flow rate of the input flue gas stream 10, the temperature of the input flue gas stream 10, power availability for the carbon capture process, among other factors specific to the industrial facility that employs the systems and processes of the present disclosure.

In line with the discussion above, the example cooling systems 200, 300, etc., of the present disclosure may advantageously solve challenges associated with implementing a carbon capture process by enabling the cooling of a flue gas stream without necessarily using an evaporative cooling water system that requires a stream of make-up water.

Figure 5:
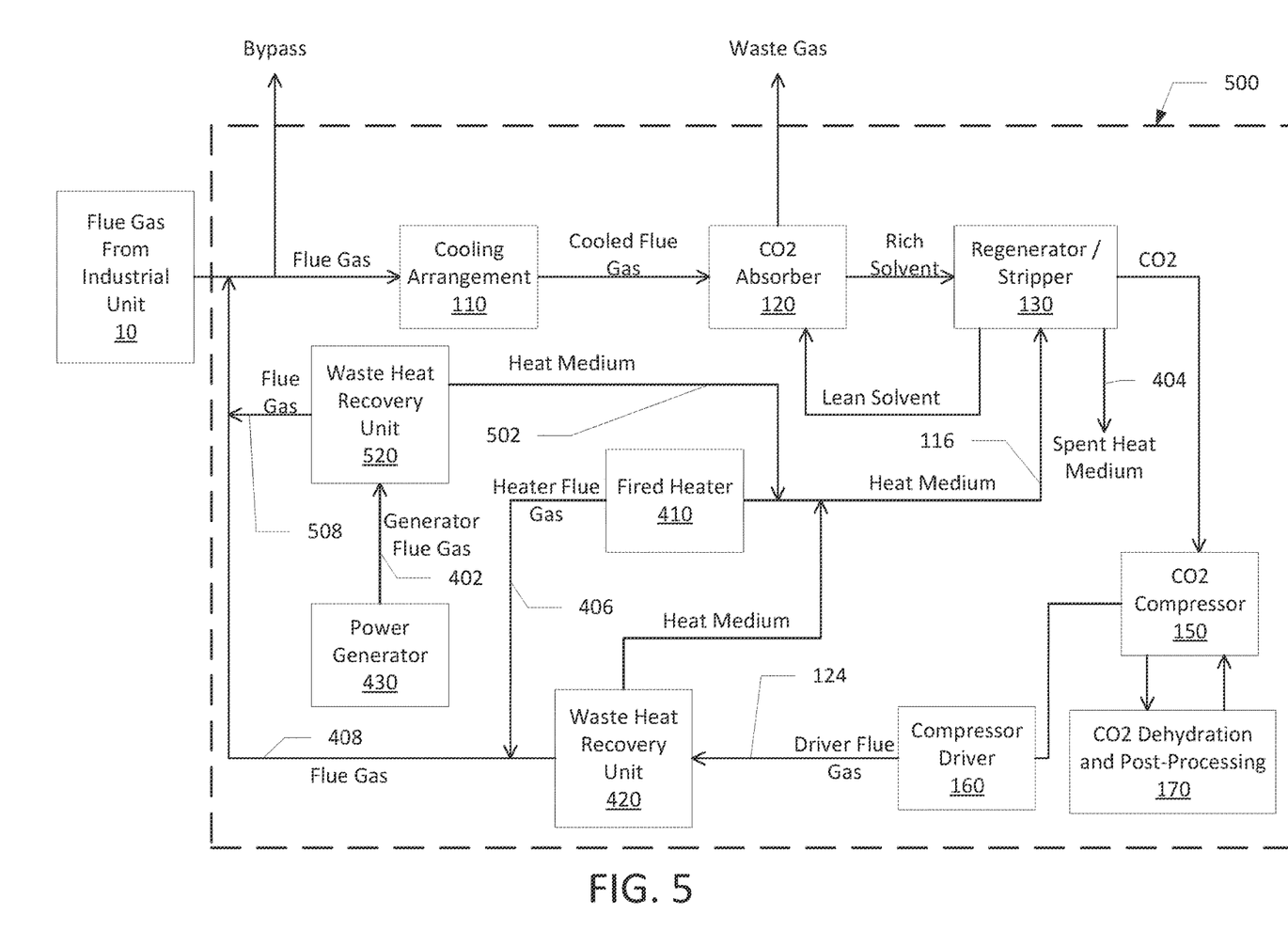
FIG. 5 is a schematic illustration of a second example heating arrangement that includes multiple waste heat recovery units, according to an example embodiment.
Figure 6:
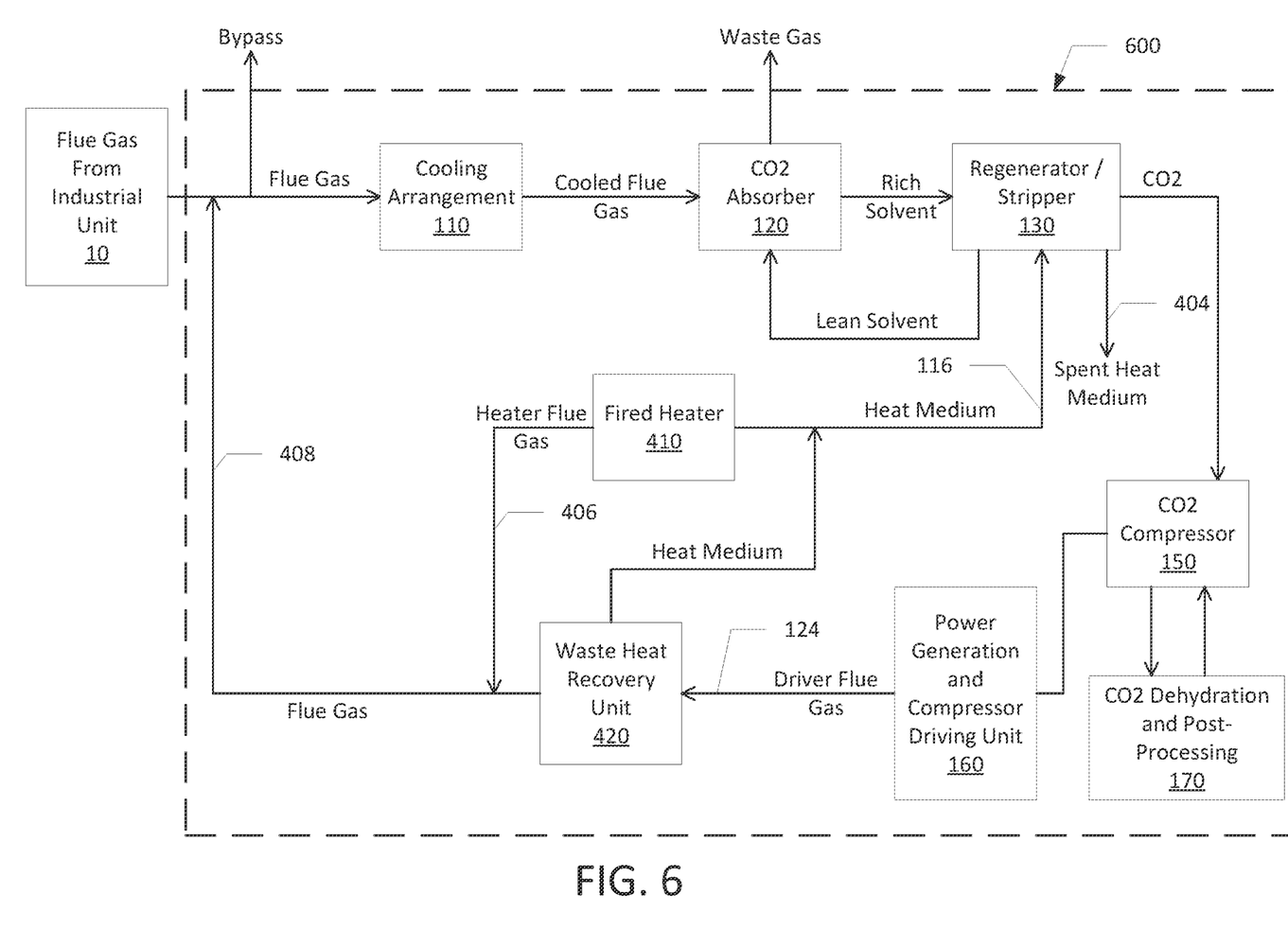
FIG. 6 is a schematic illustration of a third example heating arrangement that includes a driver for generating power and driving a CO2 compressor, according to an example embodiment.

As mentioned earlier, adopting carbon capture processes in some industrial facilities may also be challenging due to heat load requirements for solvent regeneration and/or CO2 stripping processes and power load requirements associated with operating a carbon capture facility (e.g., for operating blowers, etc.), which may sometimes require major upgrades to the existing infrastructure of an industrial facility. Accordingly, FIGS. 4-6 illustrate example optimized heating and power generation arrangements that can be used to optimize a carbon capture process and/or solve these challenges.

Figure 4:
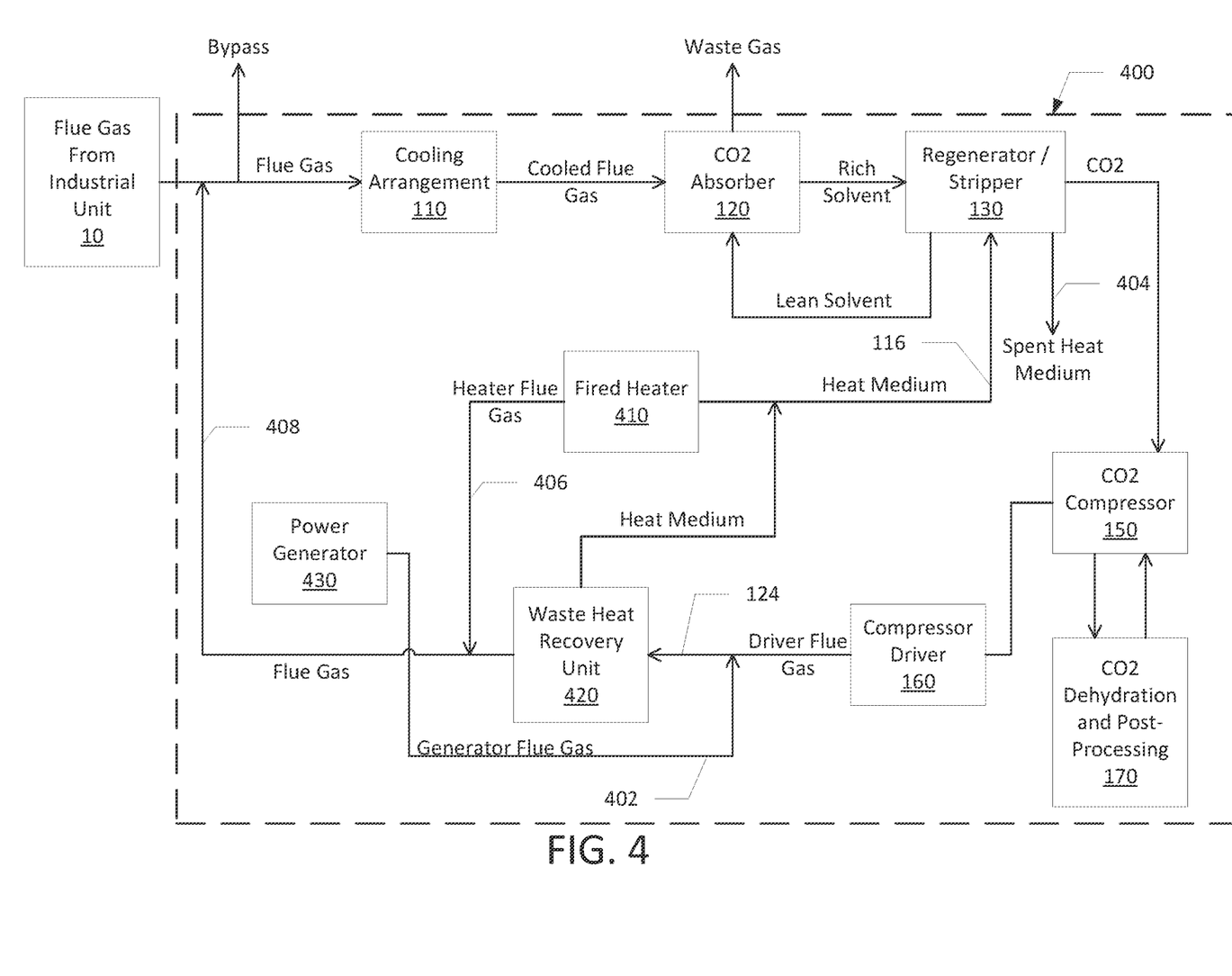
FIG. 4 is a schematic illustration of a first example heating arrangement that includes a waste heat recovery unit, according to an example embodiment.

FIG. 4 is a schematic illustration of an example carbon capture system 400 that includes an example heating arrangement for solvent regeneration and CO2 stripping, according to the present disclosure. System 400 depicts an example embodiment of the system 100, where the heating arrangement 140 of the system 100 includes a fired heater 410, a waste heat recovery unit 420, and a power generator 430.

The fired heater 410 (e.g., industrial furnace) is heater that burns a combustion fuel and transfers heat from the combustion gases to a heat medium that is transported out of the fired heater to the regenerator 130 via the conduit 116. As noted above, the heat medium may include any suitable heat medium such as steam or oil. The regenerator or stripper 130 uses the heated heat medium to regenerate the CO2 rich solvent received from the absorber 120 into a lean solvent by stripping the CO2 from the rich solvent.

As a by-product of the combustion process in the fired heater 410, the fired heater 410 may produce a heater flue gas. In the illustrated example, the heater flue gas is transported (via a conduit 406) out of the fired heater 410 and combined with the flue gas stream 10 upstream of the absorber 120 (and/or upstream of the cooling arrangement 110, the gas-to-air exchanger 210, and/or the gas-to-air exchanger 310). In some examples, the heater flue gas may be relatively cooler than the input flue gas stream 10 and could thus potentially improve the efficiency of the cooling arrangement 110 by reducing the overall temperature of the combined flue gas stream 10 (including the heater flue gas).

As noted above in the description of FIG. 1, the driver 160 may include an internal combustion engine, a gas turbine, or any other type of combustion based driver configured to provide mechanical energy to drive the compressor 150. As a product of this combustion process, the driver 160 produces a driver flue gas. The driver flue gas is transported out of the driver 160 into the waste heat recovery unit 420 via the conduit 124.

The power generator 430 may also include a combustion based power generator, such as a gas turbine or combustion engine, which generates power (e.g., electricity) for powering one or more components (e.g., gas-to-air exchangers 210, 310, blowers 212, 214, 312, etc.) of the carbon capture system. As such, the power generator 430 produces a generator flue gas, which is transported out of the power generator 430 and into the waste heat recovery unit 420 via a conduit 402.

The waste heat recovery unit 420 is an energy recovery device (e.g., heat exchanger) configured to transfer heat from the generator flue gas and/or the driver flue gas to the heat medium to further heat the heat medium so as to supplement the heat from the fired heater 410 prior to transporting the heated heat medium to the regenerator 130. In some examples, the regenerator 130 may return the spent heat medium (via a conduit 404) to the fired heater 410 and/or the waste heat recovery unit 420 so as to re-heat the heat medium.

With this arrangement, the waste heat recovery unit 420 may enable reducing parasitic loads associated with heating the heat medium by harnessing waste heat from the driver flue gas and/or the generator flue gas to efficiently heat the heat medium for the solvent regeneration and CO2 stripping process (e.g., by reducing an overall amount of fuel that would otherwise be consumed to heat the heat medium without the waste heat recovery unit 420).

After recovering heat from the generator flue gas and/or driver flue gas, the flue gas is transported out of the waste recovery unit 420 (e.g., via conduit 408) for combination with the flue gas stream 10 at a front-end of the carbon capture system 400 (e.g., as shown in FIG. 4) or at any other position upstream of the absorber 120. In some examples, the flue gas flowing out of the waste heat recovery unit 420 is cooler than the input flue gas stream 10, and could thus facilitate improving the efficiency of the cooling arrangement 110 and/or the absorber 120 by causing the combined flue gas stream 10 (including the flue gas from the waste heat recovery unit 420) to have a lower overall temperature.

FIG. 5 is a schematic illustration of an example carbon capture system 500 that includes another example heating arrangement, according to the present disclosure. System 500 depicts an example embodiment of system 100 in which the heating arrangement 140 includes two waste heat recovery units 420, 520, the fired heater 410, and the power generator 430.

In particular, the system 500 includes a first waste heat recovery unit 420 to receive (via conduit 124) the driver flue gas from the driver 160 (similarly to system 400), and a second separate waste heat recovery unit 520 to receive (via conduit 402) the generator flue gas 402 output from the power generator 430. The second waste heat recovery unit 520 extracts heat from the generator flue gas flowing into the waste heat recovery unit 520 (via conduit 402) from the power generator 430 to further heat the heat medium flowing into the regenerator 130. For example, as shown, the heated heat medium flows out of the waste heat recovery unit 520 via conduit 502 to be combined with the heated heat medium output from the fired heater 410 and/or the waste recovery unit 420 upstream of the regenerator 130.

Furthermore, in the illustrated example, the generator flue gas (after being used in waste heat recovery unit 520 to heat the heat medium) is transported out of the waste heat recovery unit 520 (e.g., via conduit 508) for combination with the input flue gas stream 10 at a front-end of the carbon capture process 500 (or at any other position upstream of the absorber 120) in line with the discussion above for the spent flue gas exiting the waste heat recovery unit 420.

In some examples, the arrangement of carbon capture system 500 may be advantageous for an industrial facility application in which the power generator 430 is not necessarily located near the compressor 150, the driver 160, and/or the waste heat recovery unit 420.

Although not shown, in some examples, the heater flue gas output from the fired heater 410 may alternatively be routed to the waste heat recovery unit 420, 520, and/or another waste heat recovery unit (not shown) to extract additional heat for further heating the heat medium prior to combining the heater flue gas with the input flue gas stream 10.

FIG. 6 is a schematic illustration of an example carbon capture system 600 that includes yet another example heating arrangement, according to the present disclosure. System 600 depicts an example embodiment of the system 100, in which a single driver 160 is used both for power generation and for driving the compressor 150. That is to say, a same driver 160 in the configuration of system 600 may perform the functions described above for the power generator 430 of FIGS. 4-5 (e.g., generate power for powering one or more components of the system 600), as well as to drive CO2 compression by the compressor 150. For example, the driver 160 of system 600 may be implemented as an internal combustion engine and/or a gas turbine that both generates power for various components of the system 600 as well as generates mechanical energy for actuating the compressor 150.

In line with the discussion above, the waste heat recovery unit 420 can receive a driver flue gas from the driver 160 (via conduit 124) and may use heat from the driver flue gas to heat the heat medium flowing out of the waste heat recovery unit 420 and into the regenerator stripper 130.

As used in this specification, including the claims, the term "and/or" is a conjunction that is either inclusive or exclusive. Accordingly, the term "and/or" either signifies the presence of two or more things in a group or signifies that one selection may be made from a group of alternatives.

The many features and advantages of the present disclosure are apparent from the written description, and thus, the appended claims are intended to cover all such features and advantages of the disclosure. Further, since numerous modifications and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable now or in the future.

What is claimed is:

1. A method for processing a flue gas stream, the method comprising:
    receiving, at a solvent regenerator, a rich solvent flowing from a carbon dioxide absorber, wherein the flue gas stream flows through the carbon dioxide absorber, and the rich solvent comprises carbon dioxide captured from the flue gas stream in the carbon dioxide absorber;
    heating a heat medium using at least a fired heater;
    transporting the heated heat medium from the fired heater to the solvent regenerator;
    generating, by the fired heater, a fired heater flue gas; and
    transporting the fired heater flue gas into the flue gas stream at a position upstream of the carbon dioxide absorber;
    producing a generator flue gas by a power generator in fluid communication with a generator flue gas waste heat recovery unit, wherein the power generator generates electricity; and
    transporting the generator flue from the power generator to the waste heat recovery unit,
    wherein heating the heat medium using the generator flue gas waste heat recovery unit is based on heat recovered by the waste heat recovery unit from the generator flue gas.

2. A method for processing a flue gas stream, the method comprising:
    receiving, at a solvent regenerator, a rich solvent flowing from a carbon dioxide absorber, wherein the flue gas stream flows through the carbon dioxide absorber, and the rich solvent comprises carbon dioxide captured from the flue gas stream in the carbon dioxide absorber;
    heating a heat medium using at least a fired heater;
    transporting the heated heat medium from the fired heater to the solvent regenerator;
    generating, by the fired heater, a fired heater flue gas;
    transporting the fired heater flue gas into the flue gas stream at a position upstream of the carbon dioxide absorber;
    driving a carbon dioxide compressor using a driver, the driver producing a driver flue gas; and
    transporting the driver flue gas from the driver to a waste heat recovery unit,
    wherein heating the heat medium using the waste heat recovery unit is based on heat recovered by the waste heat recovery unit from the driver flue gas.

3. The method of claim 2, further comprising:
    transporting, from the waste heat recovery unit, the generator flue gas into the flue gas stream upstream of the carbon dioxide absorber.

4. The method of claim 2, further comprising:
transporting, from the compressor driver waste heat recovery unit, the driver flue gas into the flue gas stream upstream of the carbon dioxide absorber.

5. The method of claim 2, wherein the driver is an internal combustion engine.

* * * * *